Nov. 8, 1966 G. L. BROWN 3,284,798

TELEPHONE RINGER

Filed Dec. 29, 1964 2 Sheets-Sheet 1

INVENTOR
GEORGE L. BROWN

BY C. A. Gulbrandsen

ATTY.

Nov. 8, 1966 G. L. BROWN 3,284,798

TELEPHONE RINGER

Filed Dec. 29, 1964 2 Sheets-Sheet 2

3,284,798
TELEPHONE RINGER

George L. Brown, Evanston, Ill., assignor to Automatic Electric Laboratories, Inc., Northlake, Ill., a corporation of Delaware Filed Dec. 29, 1964, Ser. No. 421,804
3 Claims. (Cl. 340—397)

This invention relates to electromagnetically operated signalling devices, and more particularly to polarized ringers of the type adapted for use in telephone substation sets.

Since the advent of the combined type of telephone set, which is characterized by the mounting in the base thereof, those components of the substation equipment housed previously in a separate container, or bell box, continuous efforts have been directed to the redesign of such components with a view towards space conservation and an ultimate reduction in the size and weight of the telephone set without increasing the cost or otherwise limiting the operating capability of these components.

One of the bulkier and heavier components now used in substation sets is the ringer unit, and it is a principle object of this invention to provide a telephone ringer for use in such sets which is extremely compact in structure, relatively light in weight, and which is particularly adapted for inclusion in the telephone substation in a minimum of space and at a minimum of cost.

In achieving the above-mentioned principle object, it is a specific object to provide a novel and improved single coil type polarized telephone ringer.

Modern telephone exchanges must be equipped to provide a number of types of service, and in the provision thereof, different types of ringing devices have been conventionally employed. Among the more conventional signalling systems utilized in telephone systems today are the so-called straight line ringing systems and the harmonic ringing systems. In the past, since the various signalling systems operate in response to different electrical characteristics, it has been necessary to provide at least two separate and distinct types of ringers for use in these systems. These two types of ringers are commonly called the harmonic type and the straight line type. The manufacture of these different types of rings for the different types of signalling systems is therefore quite costly, and as such, a further object of this invention is to provide a novel ringer structure which is sufficiently universal and flexible in its nature to permit the use of the general design thereof in all of the above-described types of signalling systems.

A feature of the invention relates to the utilization of a magnetic circuit of novel configuration, which lends itself to the use of a miniaturized permanent magnet, a small single coil electromagnet and simple armature and pole pieces.

Another feature of the invention relates to the provision of a miniaturized permanent magnet and its position relative to the armature of the electromagnet.

A further feature of the invention relates to the provision of a ceramic type permanent magnet which, due to its magnetic characteristics, is designed with such small dimensions as to enable direct mounting on the armature of the electromagnet.

Another feature of the invention relates to the mounting of the permanent magnet on the armature of the electromagnet in such a manner as to be external of the magnetic circuit of the electromagnet, whereby the effective life of the permanent magnet is indefinitely extended and the armature is adequately polarized.

The nature of the invention and its distinguishing features and advantages, which reside in the construction and arrangement and combination of parts will be more clearly understood from the following detailed description when taken in conjunction with the accompanying drawings, which represent a practical application thereof and wherein.

Figure 1:
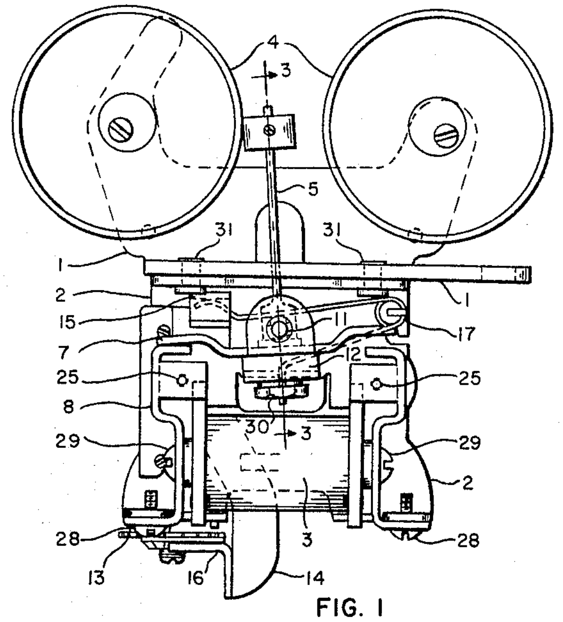
FIG. 1 is a front plan view of a telephone ringer of the straight line type embodying the features of the invention.
Figure 5:
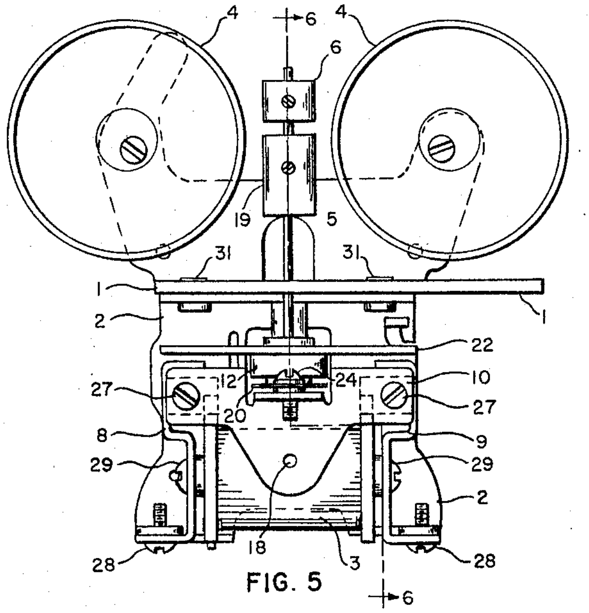
FIG. 5 is a front plan view of the telephone ringer of the harmonic type embodying the features of the invention.
Figure 8:
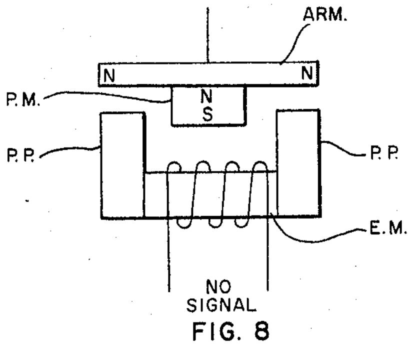
Figures 9, 10:
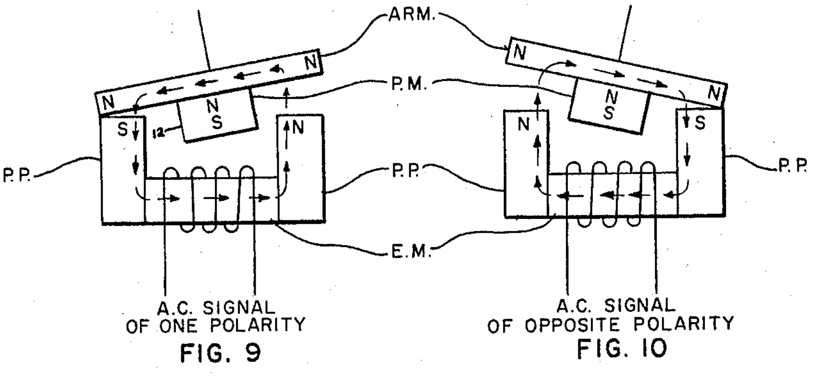

FIGS. 8–10, inclusive, are schematic illustrations of the magnetic circuits and flux paths involved in the two types of ringers shown in FIGS. 1 and 5.

A general structural description of the invention will now be given, bearing in mind that the elements thereof, which are universal to both the straight line and harmonic ringers, will carry the same reference character numbers throughout the description.

Figure 2:
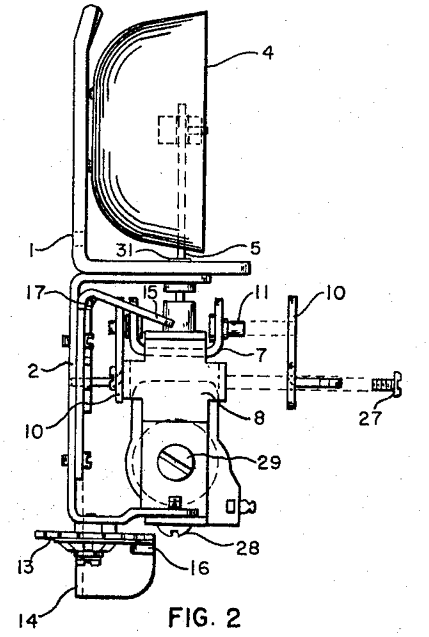
FIG. 2 shows the left-hand side of the ringer of FIG. 1.
Figure 3:
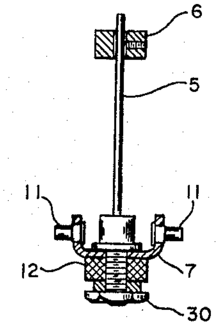
FIG. 3 is a fragmentary section taken along the lines 3—3 of FIG. 1 and looking in the direction of the arrows.
Figure 4:
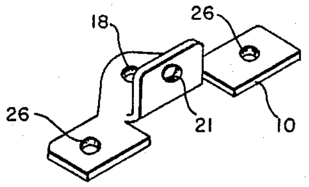
FIG. 4 is a view of the universal armature mounting bracket used in both the harmonic and straight line ringers as disclosed in this application.

Referring in particular to FIGS. 1 through 4, inclusive, for a description of the invention, when used with straight line ringers, it will be seen that the frame consists of two sections, namely the bell mounting section 1 and the electromagnet mounting section 2, with these two sections being assembled by means of rivets 31 to form the unitary frame structure. The two gongs, or bells, 4 are mounted on the bell mounting section 1 by means of screws in an obvious manner. Left-hand pole piece 8 and right-hand pole piece 9 are mounted on the ends of the core of electromagnet 3 by means of screws 29. Armature 7 is shaped as shown in FIGS. 1, 2 and 3, with one end of clapper rod 5 having a mounting flange forming a part thereof being mounted thereto by means of a hole provided in the center of the armature. Permanent magnet 12, which is in the form of a thick washer, is mounted over the portion of clapper rod 5, which protrudes through armature 7 and securely held against the armature by means of nut 30, such as shown in FIG. 3, to form the combined armature and clapper rod assembly. Armature 7 is thus polarized by permanent magnet 12 in a well-known manner. A rear armature bracket 10 is secured to two rear ears of pole pieces 8 and 9 by means of screws 27, projecting through holes 26 of bracket 10 and into threaded holes 25 of the pole-piece ears, with the armature assembly mounted so that the rear armature pivot pin 11 projects through pivot hole 18 of the rear armature bracket 10. A front armature bracket 10 is mounted on corresponding front ears of pole pieces 8 and 9 in a manner similar to the rear mounting, with the front armature pivot pin 11 projecting through pivot hole 18 of the front armature bracket 10. It will thus be seen that the armature assembly is pivotally mounted as a component part of electromagnet 3.

The entire assembly, including electromagnet 3 and the armature assembly, is mounted on the frame in the manner such as shown, with clapper rod 5 extending through a hole provided in the frame and pole pieces 8 and 9 being secured to mounting fingers, extending upward from frame section 2, by means of screws 28. Clapper 6 is mounted to clapper rod 5 by means of a set screw and the entire ringer assembly is ready for use.

A ringer volume control arrangement, comprising volume control knob 13, volume control slide 14, armature motion limiting finger 15, slide control finger 16 and slide biasing spring 17 is shown. However, since this volume control arrangement is not pertinent to the invention, no further description thereof is believed necessary.

Figure 6:
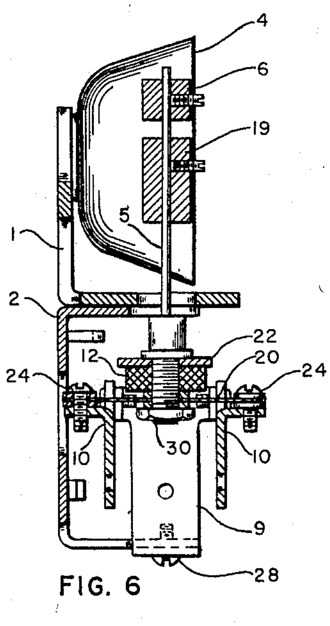
FIG. 6 is a sectional view taken along the lines 6—6 of FIG. 5 and looking in the direction of the arrows.
Figure 7:
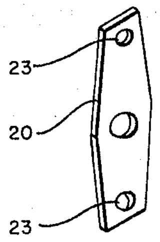
FIG. 7 is a view of the armature mounting reed as used in the harmonic ringer of FIG. 5.

Referring in particular to FIGS. 5 through 7, inclusive, for a description of the invention as used with harmonic ringers, it will be seen that the overall assembly and construction thereof is the same as that described for the straight line type and shown in FIGS. 1 through 4, with the exception of the mounting of the armature 22 and clapper rod 5 with respect to the electromagnet 3. In the harmonic ringer such as disclosed in these figures, clapper rod 5 and permanent magnet 12 are mounted on armature 22 through a hole provided therein, with reed 20 also mounted thereon by means of its center hole and held in place against the permanent magnet 12 by nut 30. Armature 22 is polarized by armature 12 in a well-known manner. It will be noted that the lengthwise or flat surface of armature 22 is at right angles to the lengthwise surface of reed 20. The complete clapper rod and armature assembly is mounted to upward extending ears of the armature brackets 10 by means of screws 24 extending through holes 23 of reed 20 and into threaded holes 21 of the aremature bracket ears. It will be noted that armature brackets 10 on the harmonic ringer are reversed with respect to the position of these brackets as shown in FIG. 2 for the straight line ringer. It will further be noted that due to the biasing action of reed 20, armature 22 in its normal position does not touch either the left pole piece 8 or the right pole piece 9 but is held an equal distance from each of them, and that the clapper rod 5 and clapper 6 are spaced an equal distance between the bells 4. Inertia weight 19 is provided whereby it may be adjustably mounted along clapper rod 5 to provide a means for tuning the harmonic ringer to a selected frequency of energization of the electromagnet coil 3 in a well-known manner.

Reference will now be had with FIGS. 8 through 10, inclusive, wherein the magnetic circuits and the flux paths associated therewith, when the invention is used with the straight line and harmonic ringers, will be discussed. It will be appreciated that the schematic illustrations as shown by these figures are for the purpose of explanation only and that the permanent magnet, armature and electromagnet are not in exact proportion to the physical arrangement and size of these elements as shown in FIGS. 1 and 5, but have been shown as such to present a more understandable description. FIG. 8 shows the electromagnet as not receiving a ringing signal, and as such discloses no flux path therefrom. The permanent magnet is shown as being attached to the armature and while no flux path therefrom is shown, the entire armature is polarized by the permanent magnet in a well-known manner. The armature of FIG. 8 is shown as being in the normal position such as the armature of the harmonic ringer shown in FIG. 5.

Referring in particular to FIG. 9, it will be seen that as the electromagnet is energized by a ringing signal, which for the moment is assumed to be of a particular polarity, the right-hand pole piece is shown as being of the north polarity and the left-hand pole piece is shown as being of the south polarity. The flux path set up by the energized electromagnet is shown as travelling in the direction of the arrows and as emerging from the north, or right-hand pole piece of the electromagnet, through the armature, leaving the armature and into the south, or left-hand pole piece of the electromagnet and back to the right-hand pole piece. It will be appreciated, that at no time does the flux path, as established by the energized electromagnet, pass through the permanent magnet, whereby the life of the permanent magnet is prolonged by stopping deterioration of its magnetic efficiency. In view of the armature being polarized by the permanent magnet, whereby the entire armature is of a north polarity, and in view of the flux path set up by the energized electromagnet, the armature is effected thereby in a well-known manner and is tilted to the left.

Referring in particular to FIG. 10, it will be seen that the electromagnet is energized by a ringing signal, which for the moment is assumed to be of an opposite polarity than that as described for FIG. 9, the right-hand pole piece is shown as being of the south polarity and the left-hand pole piece is shown as being of the north polarity. The flux path set up by the energized electromagnet is shown as travelling in the direction of the arrows and as emerging from the north, or left-hand pole piece of the electromagnet, through the armature, leaving the armature and into the south, or right-hand pole piece of the electromagnet and back to the left-hand pole piece. It will be also appreciated, that at no time does the flux path established by the energized electromagnet pass through the permanent magnet, thereby prolonging the life of the permanent magnet by stopping deterioration of its magnetic efficiency. In view of the armature being polarized by the permanent magnet, whereby the entire armature is of a north polarity, and in view of the flux path set up by the energized electromagnet, the armature is affected thereby in a well-known manner and is tilted to the right.

Having described my invention, what is considered new and is desired to have protected by Letters Patent will be pointed out in the appended claims.

What is claimed is:

1. In an electromagnetic telephone ringer comprising a core having a coil winding mounted thereon; a pole piece secured to each end of said core and extending upward therefrom; a pair of armature mounting brackets; one of said armature mounting brackets mounted on the rear sides of said pole piece extensions and the other of said brackets mounted on the front sides of said pole piece extension; an armature; means for mounting said armature between said brackets with each end thereof positioned directly above the corresponding ends of said extensions of said pole pieces; a washer-shaped permanent magnet of a substantial thickness and having its magnetic poles established at the upper and lower flat surfaces thereof; a clapper rod mounted at one end to the center of said armature by means of a hole provided therein and protruding therethrough; said permanent magnet mounted over said protruding one end of said clapper rod and firmly held against the lower side of said armature by means of a retaining nut threaded on said one end, whereby said armature is polarized by said permanent magnet to assume a polarity corresponding to the polarity of the surface of said permanent magnet adjacent thereto; said coil winding, when excited, generating an alternating magnetic flux path including said core, said pole pieces and said polarized armature for controlling movement of said armature and said clapper rod; said polarized armature excluding said alternating magnetic flux path from said permanent magnet for prolonging the life thereof by stopping deterioration of the magnetic efficiency.

2. In an electromagnetic telephone ringer comprising a core having a coil winding mounted thereon; a pole piece secured to each end of said core and extending upward therefrom; an armature; means for pivotally mounting said armature directly above said core in a plane substantially parallel therewith, with each end thereof positioned directly above the corresponding ends of said extensions of said pole pieces; a washer-shaped permanent magnet of a substantial thickness and having a magnetic pole established at the upper and lower flat surfaces thereof; a clapper rod; means including one end of said clapper rod for collectively mounting said one end and said permanent magnet to the center of said armature, whereby said permanent magnet is firmly held against said armature and said armature is polarized thereby to assume a polarity corresponding to the polarity of the surface of said permanent magnet adjacent thereto; said coil winding, when excited, generating an alternating magnetic flux path including said core, said pole pieces and said polarized armature for controlling movement of said armature and said clapper rod; said polarized armature excluding said alternating magnetic flux path from said permanent magnet for prolonging the life thereof by stopping deterioration of the magnetic efficiency.

3. In an electromagnetic telephone bell ringer comprising a core having a coil winding mounted thereon; a pole piece secured to each end of said core and extending upward therefrom; an armature; means for mounting said armature directly above said core in a plane parallel therewith, with each end thereof positioned directly above the corresponding ends of said extensions of said pole pieces; a washer-shaped permanent magnet of a substantial thickness and having its magnetic poles established at the upper and lower flat surfaces thereof; a clapper rod having a bell clapper mounted thereon; means including one end of said clapper rod for collectively mounting said one end and said permanent magnet to the center of said armature, whereby said permanent magnet is firmly held against said armature and said armature is polarized thereby to assume a polarity corresponding to the polarity of the surface of said permanent magnet adjacent thereto; signal bells; said coil winding, when excited by an alternating signal of a particular frequency, generating an alternating magnetic flux path including said core, said pole pieces and said polarized armature for controlling a vibratory movement of said armature and said clapper rod to strike said bell clapper against said signal bells; and an intertia weight adjustably mounted on said clapper rod for tuning said vibratory movement to said particular frequency of coil excitation; said polarized armature excluding said alternating magnetic flux path from said permanent magnet for prolonging the life thereof by stopping deterioration of the magnetic efficiency.

No references cited.

THOMAS B. HABECKER, *Acting Primary Examiner.*

D. L. TRAFTON, *Assistant Examiner.*